3,639,461
PROCESS FOR THE PREPARATION OF α,β-UNSATURATED MONOCARBOXYLIC ACID ESTERS
Hiroo Ito and Kaoru Kimura, Nagoya, Japan, assignors to Toa Gosei Chemical Industry Co. Ltd., Tokyo, Japan
No Drawing. Filed July 31, 1968, Ser. No. 748,909
Claims priority, application Japan, Aug. 17, 1967, 42/52,433; Oct. 17, 1967, 42/62,313
Int. Cl. C07c 69/54
U.S. Cl. 260—486 R                                6 Claims

ABSTRACT OF THE DISCLOSURE

The alkyl ester of an α,β-unsaturated monocarboxylic acid, is prepared by the vapor-phase esterification of the corresponding monocarboxylic acid and an aliphatic monohydric alcohol having from 1 to 8 carbon atoms in the presence of a catalyst, such as a titanium oxide catalyst, a titanium-antimony-oxygen catalyst, a titanium-silicon-oxygen catalyst, and a titanium-antimony-silicon-oxygen catalyst.

BACKGROUND OF THE INVENTION

Field of the invention

The present invention relates to a process for preparing an alkyl ester of an α,β-unsaturated monocarboxylic acid, and more particularly, to a process for preparing an alkyl ester of an α,β-unsaturated monocarboxylic acid, such as acrylic acid or methacrylic acid, by a vapor phase reaction.

Description of the prior art

Catalysts which are known for use in the vapor-phase esterification of α,β-unsaturated monocarboxylic acids are silica gel catalysts (U.S. Patent No. 2,947,779), a catalyst comprising a carrier having adsorbed thereon sulfuric acid, benzenesulfonic acid or toluenesulfonic acid (British Patent No. 1,017,806), silica-alumina catalysts, and phosphoric acid-diatomaceous earth catalysts.

The conventional catalysts described above quickly lose their catalytic activity, and hence it is economically unprofitable to use these catalysts for esterification reactions.

SUMMARY OF THE INVENTION

The inventors have found that an α,β-unsaturated monocarboxylic acid ester can be prepared with high yields by the vapor-phase esterification of the corresponding α,β-monocarboxylic acid and an aliphatic monohydric alcohol having from 1 to 8 carbon atoms by using a catalyst selected from the group consisting of titanium, titanium and antimony, titanium and silicon, and titanium, antimony and silicon; in combination with oxygen.

Esterification selectivity can be improved by supplying a predetermined amount of water to the reaction zone. The preferred mole ratio to α,β-unsaturated monocarboxylic acid is from 2–52 to 1.

The preferred mole ratio of the α,β-monocarboxylic acid to aliphatic monohydric alcohol is 1 to 1–8.

The reaction temperature is preferably maintained in the range of from about 150° to 400° C., most preferably 180° to 300° C.

The spaced velocity of the reaction gas mixture in the catalyst layer is preferably from about 50 to about 2000, most preferably from about 500 to 1500.

Thus, an object of this invention is to provide a process for preparing α,β-unsaturated monocarboxylic acid esters efficiently and in good yields by using an improved esterification catalyst.

Another object of this invention is to provide an improved esterification catalyst for the production of α,β-unsaturated monocarboxylic acids which can maintain its activity for a long period of time during esterification.

DESCRIPTION OF THE PREFERRED EMBODIMENTS

According to the process of this invention, an alkyl ester of an α,β-unsaturated monocarboxylic acid is prepared by contacting an α,β-unsaturated monocarboxylic acid with an aliphatic monohydric alcohol having from 1–8 carbon atoms in the vapor phase and in the presence of a catalyst selected from the group consisting of titanium, titanium and antimony, titanium and silicon, and titanium, antimony and silicon; in combination with oxygen.

The most typcal examples of the α,β-unsaturated monocarboxylic acid used in the present invention are acrylic acid and methacrylic acid, but other α,β-unsaturated monocarboxylic acids such as α-ethylacrylic acid and crotonic acid may also be employed.

As the aliphatic monohydric alcohols having from 1–8 carbon atoms used the other ingredient in this invention, there are methanol, ethanol, n-propanol, n-butanol, isobutanol, n-pentanol, isoamyl alcohol, n-hexanol, n-heptanol, n-octanol, 2-ethylhexanol, oxoheptanol, allyl alcohol, methallyl alcohol, and the like.

The aforesaid starting materials used in the process of this invention need not be completely pure. In fact, the presence of a polymerization inhibitor, such as hydroquinone or hydroquinone monomethyl ether, as well as impurities such as formic acid and acetic acid in the α,β-unsaturated monocarboxylic acid, will not have a normal influence on the esterification of this invention.

The α,β-unsaturated monocarboxylic acid ester formed by the esterification of this invention can be easily separated from the reaction product by extraction or distillation.

The process of this invention can be also conducted without any problems by using the α,β-unsaturated monocarboxylic acid and the aliphatic monohydric alcohol as a mixture with water. In fact, the selectivity for the esterification of this invention can be improved by supplying a definite predetermined amount of water to the reaction zone. The preferred mole ratio of water to the α,β-unsaturated monocarboxylic acid is from 2–50 to 1. If the amount of water supplied is greater than the above range, the conversion ratio of the α,β-unsaturated monocarboxylic acid to the ester will be reduced. Since a vapor phase reaction is contemplated, such water will usually be in the form of steam.

The preferred mole ratio of the α,β-unsaturated monocarboxylic acid to the aliphatic monohydric alcohol is about 1 to 1–8. If the proportion of the alcohol is reduced, the conversion ratio of the α,β-unsaturated monocarboxylic acid to the ester will be reduced. If the proportion of the alcohol is increased, the conversion ratio of the monocarboxylic acid and the selectivity for the esterification reaction may be improved, but the purification of the esterification product becomes very difficult, due to the presence of increased amounts of unreacted alcohol.

The reaction temperature in this invention is preferably 150–400° C., most preferably 180–300° C. If the temperature is lower than 150° C., the rate of reaction is lowered. If it is higher than 400° C., the occurrence of side-reactions, such as the decomposition of the α,β-unsaturated monocarboxylic acid and the dehydration of the alcohol will be increased.

The space velocity of the reaction gas mixture in the catalyst layer in the present invention is from 50–2,000, most preferably from 500–1,500. If the hourly space velocity is lower than the above range, the conversion ratio of the α,β-unsaturated monocarboxylic acid to the ester may be increased, but the selectivity for the esterification will be reduced to about 90%. On the other hand, if the hourly space velocity is higher than the above range, the conversion ratio to the ester is reduced to about 30–40%.

The catalyst used in the process of this invention is preferably prepared by: decomposing a salt, an ester or an acid of titanium or a mixture of salts, ester or acids of titanium and antimony and/or silicon to provide a titanium oxide or a mixture of titanium oxide and the oxide of antimony and/or silicon; moulding the oxide or oxide mixture into particles, cylinders or pellets; drying the mouldings; and then calcining them in air for several hours at about 200–600° C. Instead of using the salts, esters or acids mentioned above, an oxide of titanium or a mixture of an oxide of titanium and an oxide of antimony and/or silicon obtained any suitable manners may be employed as the starting materials for the catalyst.

As the titanium oxide which is a main component for the titanium oxide catalyst (titania-type catalyst), there may be employed titanium oxide prepared by decomposing titanium halides such as titanium tetrachloride, titanium tetrabromide; an alkyl ester of orthotitanic acid wherein the carbon number of the alkyl group is 1–8; metatitanic acid; orthotitanic acid; titanium acetylacetonate; titanium peroxide; and the like. Commercially available pellets of titanium oxide may also be used.

As the antimony oxide used in preparing the catalyst comprising titanium and antimony in combination with oxygen, there may be employed the decomposition product of antimony halides such as antimony pentachloride, antimony pentabromide, or antimonic acid, or commercially available antimony oxide. In this type of catalyst, the atomic ratio of titanium to antimony is generally from 1:10 to 10:1 and, in particular, a range of from 1:3 to 3:1 will give an excellent conversion ratio as well as excellent selectivity for esterification.

The titanium oxide, or a mixture of titanium oxide and antimony oxide, may be supported by a carrier. That is, the titanium oxide, or a mixture of the titanium oxide and antimony oxide, may be deposited on a catalyst carrier, such as alumina, diatomaceous earth, silica-alumina, aluminum phosphate, titanium sponge, activated carbon, bentonite and the like, by an immersion method. The carrier is then generally calcined for a few hours at 200–600° C.

The catalyst comprising titanium and silicon in combination with oxygen may be prepared as follows, for example: titanium tetrachloride is added in a large amount of water, and silica gel having a grain size of from 5–50 mesh is further added to the mixture. The resultant mixture is gradually heated, with stirring, to hydrolyze the titanium compound, and thereafter the mixture is dried and calcined for a few hours at 200–600° C. In this case, the amount of titanium (as titanium oxide) on the silica gel may be varied from about 1–30% by weight.

The catalyst comprising titanium, antimony and silicon in combination with oxygen may also be prepared, for example, as follows: the aforesaid decomposition product of a titanium compound (or a commercially available titanium oxide) and the aforesaid decomposition product of the antimony compound (or a commercially available antimony oxide) are deposited on a silica gel by an immersion process. After drying the mixture, it is calcined for a few hours at 200–600° C. to yield the catalyst.

The amount of titanium oxide and antimony oxide on the silica gel is suitably from about 1–30% by weight; and the atomic ratio of titanium to antimony is generally from 1:10 to 10:1, but a ratio of 1:3 to 3:1 gives an excellent conversion ratio as well as an excellent selectivity for esterification.

In the esterification of this invention, a gas mixture containing acrolein, organic acids, and the like, as well as an α,β-unsaturated monocarboxylic acid prepared by the vapor-phase oxidation of olefins or α,β-unsaturated aldehydes, may be directly introduced to an esterifying reactor, together with an alcohol vapor, to conduct the esterification.

The reaction of this invention is generally conducted at normal pressure. Moreover, in the practice of this invention's reaction, the addition of a small amount of oxygen to the reaction zone is effective for inhibiting the occurrence of polymerization reactions.

The catalyst used in this invention has a great advantage in that it can be prepared easily. The charging of the catalyst to a reactor is also easy as the catalyst is not "infected" by the presence of humidity and the like. Moreover, since the raw materials for the catalyst are available at low cost, the activity of the catalyst is not readily reduced, and the alkyl ester of the α,β-unsaturated monocarboxylic acid can be produced with a high yield by using the catalyst, the use of these catalysts makes the process of this invention very profitable in the industry.

The invention will now be explained in great detail by the following examples, in which "part" is "part by weight"; "mesh" is "Tyler"; and the yield (percent) and the selectivity (percent) used in the following examples are determined by the following equations, respectively:

Yield $$= \frac{\text{number of moles of } \alpha,\beta\text{-unsaturated monocarboxylic acid ester formed}}{\text{number of moles of } \alpha,\beta\text{-unsaturated monocarboxylic acid charged}} \times 100$$

Selectivity $$= \frac{\text{number of moles of } \alpha,\beta\text{-unsaturated monocarboxylic acid ester formed}}{\text{number of moles of } \alpha,\beta\text{-unsaturated monocarboxylic acid charged} - \text{number of moles of unreacted } \alpha,\beta\text{-unsaturated monocarboxylic acid}} \times 100$$

Examples 1–4.—Titanium oxide prepared by the hydrolysis of titanium tetrachloride was molded into particles having a 10 mesh size, and calcined for three hours at 400° C. Then, 110 ml. of the thus prepared catalyst having 5–6 mesh grain size, and a 0.95 apparent specific gravity, was charged into a stainless steel reactor of 27 mm. inside diameter equipped with outer heating means. In addition, a Raschig ring layer was formed at the inlet side of the reactor to evaporate and preheat the raw materials.

An aqueous solution of the α,β-unsaturated monocarboxylic acid (containing hydroquinone in an amount of 0.01% by weight of the carboxylic acid) and the alcohol, each of which is shown in Table 1 below, were separately supplied to the top of the reactor by means of a metering pump, and reacted. The product gases which were withdrawn from the reactor were introduced into a condenser maintained at 5–10° C., and the condensed components were separated.

The condensate mainly comprised the corresponding ester and water. The ester content was determined from the difference between the total number of double bonds (determined by a bromine method) and the acid content determined by alkali titration.

The results obtained by conducting the esterification under various conditions are shown in the following table.

TABLE 1

| Example | Organic acid and concentration (percent) of aqueous solution of acid | Alcohol | (A) | (B) | (C) | (D) | (E) |
|---|---|---|---|---|---|---|---|
| 1 | Acrylic acid; 25% | Ethanol | 6 | 200 | 400 | 78.8 | 98.5 |
| 2 | do | do | 3 | 200 | 530 | 65.0 | 98.5 |
| 3 | Methacrylic acid; 25% | n-Butanol-6 | 6 | 230 | 400 | 70.5 | 98.0 |
| 4 | Crotonic acid; 10% | Methanol | 6 | 220 | 400 | 73.0 | 98.0 |

Note.—(A)=Mole ratio of alcohol to acid; (B)=Reaction temperature (° C.); (C)= hourly space velocity; (D)=Yield (percent); (E)=Selectivity (percent).

Examples 5–8.—Titanium tetrachloride and antimony pentachloride were simultaneously hydrolyzed and the product was dried by evaporating off water. The product thus obtained had an 8/2 atomic ratio of Ti/Sb. The product mixture was molded under pressure into particles having a size of 10 mesh, and calcined for three hours at 300° C.

The catalyst (110 ml.) thus prepared was charged to the reactor as in Example 1, and then the esterification was conducted under the conditions shown in Table 2, the results of which are shown in the same table.

TABLE 2

| Example | Organic acid and concentration (percent) of aqueous solution of acid | Alcohol | (A) | (B) | (C) | (D) | (E) |
|---|---|---|---|---|---|---|---|
| 5 | Acrylic acid; 30% | Methanol | 3 | 200 | 300 | 68.5 | 99.0 |
| 6 | Acrylic acid; 25% | Ethanol | 6 | 210 | 400 | 75.9 | 99.5 |
| 7 | Methacrylic acid; 30% | do | 4 | 220 | 300 | 72.3 | 99.0 |
| 8 | Methacrylic acid; 25% | do | 4 | 200 | 500 | 70.3 | 99.0 |

Note.—(A), (B), (C), (D) and (E) have the same meaning as in Table 1.

Examples 9–14.—Isopropyl orthotitanate was added to water to form a solution and then each of the various carriers (having a 10 mesh grain size) shown in Table 3 was added to a sample of the solution. The system was boiled, with occasional stirring, whereby the hydrolyzed product was deposited on the carrier, which product was then dried and calcined for three hours at 400° C. to provide the catalysts shown in Table 3.

The catalyst (110 ml.) thus prepared was charged in the same reactor as in Example 1, and the esterification was conducted, the results of which are shown in Table 3. In the above esterification, the reaction temperature was 210° C., the hourly space velocity was 300, and the concentration of the aqueous solution of acrylic acid or methacrylic acid was 25%.

TABLE 3

| Example | Catalyst | Organic acid | Alcohol | (A) | (B) | (C) |
|---|---|---|---|---|---|---|
| 9 | $TiO_2$ (10%) active carbon (90%) | Acrylic acid | Ethanol | 6 | 74.5 | 99.5 |
| 10 | $TiO_2$ (5%)/Al phosphate (95%) | do | do | 6 | 81.4 | 98.7 |
| 11 | do | do | Methanol | 4 | 73.6 | 97.8 |
| 12 | $TiO_2$ (10%) diatomaceous earth (90%) | Methacrylic acid | do | 4 | 72.3 | 98.5 |
| 13 | do | Acrylic acid | Ethanol | 6 | 86.7 | 96.8 |
| 14 | $TiO_2$ (10%)/alumina (90%) | do | do | 6 | 69.0 | 96.5 |

Note.—(A)=Mole ratio of alcohol to acid; (B)=Yield (percent); and (C)=Selectivity (percent).

Examples 15–19.—Antimony oxide ($Sb_2O_5$) and titanium tetrachloride were added to cold water and the mixture was heated, with stirring. Then, each catalyst carrier (having a 10 mesh grain size) shown in Table 4 was added to the system, and the resultant product was dried to provide the catalyst shown in Table 4. The catalyst (110 ml.) thus prepared was charged in the same reactor as in Example 1, and the esterification was conducted, the results of which are shown in Table 4. In the esterification, the reaction temperature was 210° C., the hourly space velocity was 400, and the concentration of the aqueous solution of acrylic acid or methacrylic acid was 25%.

TABLE 4

| Example | Catalyst | Organic acid | Alcohol | (A) | (B) | (C) |
|---|---|---|---|---|---|---|
| 15 | (I) | Acrylic acid | Ethanol | 3 | 60.5 | 99.0 |
| 16 | (I) | Methacrylic acid | Butanol | 4 | 61.6 | 98.0 |
| 17 | (II) | Acrylic acid | Ethanol | 6 | 70.3 | 98.5 |
| 18 | (III) | Methacrylic acid | do | 3 | 62.3 | 98.0 |
| 19 | (IV) | Acrylic acid | Butanol | 6 | 65.8 | 98.0 |

Note.—(I): $Sb_2O_5$ (2.5%)/$TiO_2$ (6%)/diatomaceous earth (91.5%); (II): $Sb_2O_5$ (2.5%)/$TiO_2$ (6%)/silica-alumina (91.5%); (III): $Sb_2O_5$ (5%)/$TiO_2$ (5%)/aluminum phosphate (90%); and (IV): $Sb_2O_5$ (5%)/$TiO_2$ (5%)/bentonite (90%). (A), (B), and (C) have the same meanings as in Table 3.

Example 20.—To 150 parts of cold water there was gradually added 23.8 parts titanium tetrachloride. After further adding 90 parts of silica gel having a 20 mesh grain size, the resultant mixture was heated for one hour at 100° C., with stirring, to conduct the hydrolysis. The product was then dried and calcined for three hours at 500–600° C. The catalyst (100 ml.) thus prepared was charged in the same reactor as in Example 1.

An aqueous 25% acrylic acid solution was mixed with 6 moles of ethanol per 1 mole of acrylic acid, and the mixture thus prepared was supplied to the reactor by means of a metering pump at the hourly space velocity and reaction temperature shown in Table 5 to conduct the vapor-phase esterification, the results of which are also shown in Table 5.

TABLE 5

| Reaction temp. (° C.) | Space velocity | Yield (percent) | Selectivity (percent) |
|---|---|---|---|
| 204–206 | 330 | 82.7 | 99.5 |
| 204–206 | 440 | 73.8 | 99.5 |
| 204–206 | 590 | 63.1 | 99.5 |
| 204–206 | 400 | 93.0 | [1] 99.5 |
| 258–263 | 330 | 78.7 | 97.7 |
| 310–315 | 440 | 69.2 | 95.0 |

[1] In this experiment, vaporized acrylic acid was used instead of the aqueous 25% acrylic acid solution.

Example 21.—The same procedure as in Example 20 was repeated using an aqueous acrylic acid solution having: the concentrations shown in Table 6; the hourly space velocity shown in Table 6; and a reaction temperature of 200–210° C. The result of these runs are also shown in Table 6.

TABLE 6

| Concentration of aqueous solution of acrylic acid (percent) | Space velocity | Yield | Selectivity (percent) |
| --- | --- | --- | --- |
| 10 | 350 | 67.0 | 99.5 |
| 17.5 | 340 | 77.0 | 99.5 |
| 35 | 250 | 83.6 | 97.8 |
| 50 | 220 | 86.8 | 95.3 |

Example 22.—The same procedure as in Example 20 was repeated while employing a mixture of an aqueous 25% acrylic acid solution and ethanol in the mole ratios shown in Table 7, under the hourly space velocity shown in the same table and at a reaction temperature of 200–210° C. The results of these process runs are shown in Table 7.

TABLE 7

| EtOH/acrylic acid (molar ratio) | Space velocity | Yield (percent) | Selectivity (percent) |
| --- | --- | --- | --- |
| 2 | 320 | 46.5 | 99.5 |
| 4 | 290 | 74.6 | 99.5 |
| 8 | 240 | 83.0 | 99.5 |

Example 23.—The same procedure as in Example 20 was repeated while using a mixture of an aqueous 25% methacrylic acid solution and 6 moles (per one mole of methacrylic acid) of ethanol. The reaction temperature was 200–205° C., and the hourly space velocity was 320. The yield was 78.2% and the selectivity was 99.3%.

Example 24.—A titanium oxide prepared by hydrolyzing isopropyl ortho-titanate was carried on silica gel in an mount of 5% by weight, and 110 ml. of the prepared catalyst was charged in the same reactor as in Example 1. A mixture of an aqueous 10% crotonic acid solution and 4 moles (per one mole of the crotonic acid in the solution) of methanol was then supplied into the reactor at a hourly space velocity of 320 and at a reaction temperature of 210° C. to conduct the vapor-phase esterification. The yield was 74.8% and the selectivity was 99.0%.

Example 25.—The same procedure as in Example 20 was repeated while using a mixture of an aqueous 25% acrylic acid solution and an alcohol in the mole ratios shown in Table 8. The hourly space velocity is shown in the same table, and the reaction temperature was 205–210° C. The results of these process runs are also shown in Table 8.

TABLE 8

| Alcohol | Alcohol/acid (molar ratio) | Space velocity | Yield (percent) | Selectivity (percent) |
| --- | --- | --- | --- | --- |
| Methanol | 4 | 360 | 80.3 | 99.2 |
| n-Propanol | 4 | 300 | 70.0 | 98.8 |
| n-Butanol | 3 | 320 | 68.5 | 98.3 |

Examples 26–34.—To 100 parts of cold water there were added (slowly) 5 parts of titanium tetrachloride and 10 parts of antimony pentachloride. After further adding 85 parts of silica gel having a 10 mesh grain size, the resulting mixture was heated for one hour at 100–110° C., with stirring, to conduct the hydrolysis. The product was dried and calcined for three hours at 400° C., and 100 ml. of the catalyst thus prepared was charged in the same reactor as in Example 1. The esterification was conducted at normal pressure, the results of which are shown in Table 9.

TABLE 9

| Example | Organic acid and concentration (percent) of aqueous solution of acid | Alcohol | (A) | (B) | (C) | (D) | (E) |
| --- | --- | --- | --- | --- | --- | --- | --- |
| 26 | Acrylic acid; 25% | Methanol | 6 | 200 | 600 | 83.0 | 99.5 |
| 27 | do | do | 3 | 200 | 580 | 65.3 | 99.0 |
| 28 | do | do | 2.5 | 200 | 570 | 62.3 | 99.5 |
| 29 | do | Ethanol | 3 | 200 | 490 | 61.6 | 99.5 |
| 30 | do | do | 4 | 200 | 530 | 70.5 | 99.5 |
| 31 | Methacrylic acid; 25% | Methanol | 4 | 220 | 320 | 75.0 | 99.5 |
| 32 | Methacrylic acid; 10% | Ethanol | 4 | 220 | 320 | 69.5 | 99.0 |
| 33 | Methacrylic acid; 25% | Butanol | 6 | 240 | 350 | 72.2 | 98.0 |
| 34 | Crotonic acid; 10% | Methanol | 6 | 220 | 400 | 75.0 | 99.0 |

NOTE.—(A), (B), (C), (D), and (E) have the same meanings as in Table 1.

Examples 35–37.—To 100 parts of cold water there were added (slowly) 7.5 parts of isopropyl orthotitanate and 5 parts of antimony pentachloride. After further adding 90 parts of a silica gel having a 10 mesh grain size, the resultant mixture was heated for one hour at 100–110° C. to conduct the hydrolysis. The product was dried, with stirring, to deposit the hydrolyzed mixture on the carrier, and the mixture was calcined for three hours at 400° C. The catalyst (100 ml.) thus prepared was charged in the same reactor as in Example 1, and the vapor phase esterification was conducted under the conditions shown in Table 10 at normal pressure. The results of these process runs are also shown in Table 10.

TABLE 10

| Example | Organic acid and concentration (percent) of aqueous solution of acid | Alcohol | (A) | (B) | (C) | (D) | (E) |
| --- | --- | --- | --- | --- | --- | --- | --- |
| 35 | Acrylic acid; 25% | Ethanol | 6 | 220 | 850 | 75.2 | 99.5 |
| 36 | Acrylic acid; 50% | do | 6 | 220 | 300 | 83.5 | 99.0 |
| 37 | Methacrylic acid; 25% | n-Hexanol | 4 | 220 | 300 | 60.5 | 98.5 |

NOTE.—(A), (B), (C), (D), and (E) have the same meanings as in Table 1.

While the above has been described in connection with the preferred embodiments of this invention, it will be obvious to those skilled in the art that various changes and modifications may be made therein without departing from the invention, and it is desired, therefore, to cover in the appended claims all such changes and modifications which fall within the true spirit and scope of the invention.

What is claimed is:

1. A process for the preparation of an $\alpha,\beta$-unsaturated monocarboxylic acid ester from an $\alpha,\beta$-unsaturated monocarboxylic acid having from 3–5 carbon atoms and an aliphatic monohydric alcohol having from 1–8 carbon atoms, which comprises contacting at a temperature of from 150 to 400° C., said $\alpha,\beta$-unsaturated monocarboxylic acid with said aliphatic monohydric alcohol in a molar ratio of from 1:1 to 1:8 in the vapor phase in the presence of water and in the presence of a catalyst selected from the group consisting of titanium in combination with oxygen, titanium and antimony in combination with oxygen, titanium and silicon in combination with oxygen, and titanium, antimony and silicon in combination with oxygen.

2. The process as claimed in claim 1 wherein said catalyst is deposited on a carrier material.

3. The process as claimed in claim 2 wherein said carrier is selected from the group consisting of silica gel, activated carbon, a titanium sponge, and aluminum phosphate.

4. The process as claimed in claim 1 wherein the number of moles of the vapor of said alcohol is greater than the number of moles of the vapor of said $\alpha,\beta$-unsaturated monocarboxylic acid.

5. The process as claimed in claim 1 wherein said $\alpha,\beta$-unsaturated monocarboxylic acid is acrylic acid.

6. The process as claimed in claim 1 wherein said $\alpha,\beta$-unsaturated monocarboxylic acid is methacrylic acid.

References Cited

UNITED STATES PATENTS

| | | | |
|---|---|---|---|
| 2,822,348 | 2/1958 | Haslam | 260—486 X |
| 2,947,779 | 8/1960 | Idol | 260—486 |
| 3,056,817 | 10/1962 | Werber | 260—486 X |
| 3,442,934 | 5/1969 | Pine | 260—486 |

FOREIGN PATENTS

| | | | |
|---|---|---|---|
| 1,385,294 | 11/1964 | France | 260—486 |

LORRAINE A. WEINBERGER, Primary Examiner

P. J. KILLOS, Assistant Examiner

U.S. Cl. X.R.

252—454, 461